(12) United States Patent
Abarotin (10) Patent No.: US 11,958,319 B2
(45) Date of Patent: Apr. 16, 2024

(54) HEAVY TRUCK TIRE TREAD AND HEAVY TRUCK TIRE WITH ASYMMETRICAL TEAR DROP SIPES

(71) Applicant: Compagnie Generale des Etablissements Michelin, Clermont-Ferrand (FR)

(72) Inventor: Victor Abarotin, Greer, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 205 days.

(21) Appl. No.: 17/604,029

(22) PCT Filed: May 10, 2019

(86) PCT No.: PCT/US2019/031781
§ 371 (c)(1),
(2) Date: Oct. 15, 2021

(87) PCT Pub. No.: WO2020/231391
PCT Pub. Date: Nov. 19, 2020

(65) Prior Publication Data
US 2022/0203777 A1   Jun. 30, 2022

(51) Int. Cl.
*B60C 11/12* (2006.01)
*B60C 11/03* (2006.01)

(52) U.S. Cl.
CPC ...... *B60C 11/1204* (2013.01); *B60C 11/0302* (2013.01); *B60C 11/124* (2013.01);
(Continued)

(58) Field of Classification Search
CPC .............. B60C 11/1281; B60C 11/124; B60C 11/0302; B60C 2011/1227
See application file for complete search history.

(56) References Cited

U.S. PATENT DOCUMENTS

2013/0105053 A1* 5/2013 Tanaka ............... B60C 11/1281
152/209.18
2018/0281530 A1 10/2018 Lawson et al.

FOREIGN PATENT DOCUMENTS

EP        1920951 A1      5/2008
JP     01-101205 A  *   4/1989
(Continued)

OTHER PUBLICATIONS

Machine translation for Japan 2013-126842 (Year: 2023).*
(Continued)

*Primary Examiner* — Steven D Maki
(74) *Attorney, Agent, or Firm* — Neal P. Pierotti (57) ABSTRACT

A heavy truck tire directional tread is provided that has two successive asymmetrical sipes (14) in the longitudinal direction that share at least some of the same offset from a tread edge in the lateral direction. Each of the two asymmetrical sipes (14) has a body (28) and a tear drop (30). The surface of the bottom of the sipe (14) has a radius of curvature that is not the same along the entire surface of the bottom. The geometry of the sipes resists crack initiation and propagation and is governed by the equation $R_{A,B\text{-}avg} > 1\text{-}4 \times R_{ref}$, wherein $R_{a,B\text{-}avg}$ is the average radius of a particular portion of the bottom of the sipe, and Rref is a reference radius of the bottom of the sipe.

11 Claims, 5 Drawing Sheets

(52) U.S. Cl.
CPC ... *B60C 11/1281* (2013.01); *B60C 2011/1227* (2013.01); *B60C 2200/06* (2013.01)

(56) References Cited

FOREIGN PATENT DOCUMENTS

| | | | |
|---|---|---|---|
| JP | 07172113 A | | 7/1995 |
| JP | 3208417 B2 | | 9/2001 |
| JP | 3270521 B2 | | 4/2002 |
| JP | 2009166762 A | | 7/2009 |
| JP | 2013-126842 A | * | 6/2013 |
| WO | WO-2019/066839 A1 | * | 4/2019 |

OTHER PUBLICATIONS

Machine translation for Japan 01-101205 (Year: 2023).*
European Patent Office, International Search Report dated Jun. 21, 2019, pp. 1-14 (included), European Patent Office, Rijswijk, The Netherlands.

* cited by examiner

HEAVY TRUCK TIRE TREAD AND HEAVY TRUCK TIRE WITH ASYMMETRICAL TEAR DROP SIPES

CROSS-REFERENCE TO RELATED APPLICATIONS

The present application is a 35 U.S.C. § 371 application of PCT/US19/31781 filed on May 10, 2019 and entitled "Heavy Truck Tire Tread and Heavy Truck Tire with Asymmetrical Tear Drop Sipes." PCT/US19/31781 is incorporated by reference herein in its entirety for all purposes.

FIELD OF THE INVENTION

This invention relates generally to tire treads and tires. More specifically, this invention relates to tire treads and tires best suitable for the axle(s) of heavy trucks such as the drive axle(s) of tractors used in tractor-semi-trailer combinations or of single unit straight trucks that feature successive asymmetrical tear drop sipes that have a geometry that resists crack initiation and propagation.

BACKGROUND OF THE INVENTION

Tire treads generally extend about the outer circumference of a tire to operate as the intermediary between the tire and a surface upon which it travels (the operating surface). Contact between the tire tread and the operating surface occurs along a footprint of the tire. Tire treads provide grip to resist tire slip that may result during tire acceleration, braking, and/or cornering. Tire treads may also include tread features such as ribs, lugs, grooves and sipes, each of which may assist in providing target tire performance when a tire is operating under particular conditions. One problem with treads for tires, and in particular drive tires, is the compromise between traction, rolling resistance and wear/abnormal wear.

It is known that adding sipes in a tire rib can improve wear rate and traction, but the presence of sipes can also increase the risk of cracking, typically at the bottom of the sipes. Sipes can be provided as tear drops sipes that have an enlargement, usually circular in cross-sectional shape, at the bottom to address cracking issues at the bottom of the sipe. The circular cross-sectional shape increases the radius of the bottom of the sipe, which reduces stress concentrations at the bottom to minimize crack initiation.

It is known to include tear drop sipes in the shoulder of drive axle tires. For these sipes, a large size tear drop is needed in order to reduce cracking due to the large amount of torque imparted onto the tire. However, such a large diameter tear drop can create other problems in the shoulder, such as unwanted compression of the edge of blocks in the shoulder, due to the undercut formed by the large diameter tear drop. This undercut may possibly lead to abnormal wear in the tire. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes the same or similar features.

DETAILED DESCRIPTION OF PARTICULAR EMBODIMENTS

Reference will now be made in detail to embodiments of the invention, examples of which are illustrated in the drawings. These examples are provided by way of explanation of the invention.

The present invention provides for a tread 12 that has a tear drop sipe 14 that has an asymmetrical shape. The tear drop 30 of the sipe 14 is asymmetrical in shape such that the bottom surface 44 of the sipe 14 does not have a radius of curvature 50 that is the same across its entire length. The bottom surface 44 has a configuration such that an average radius $R_{A.B.avg}$ between tangent points A and B is greater than 1.4 times a reference radius $R_{ref}$. This arrangement results in an asymmetrical sipe 14 with the tear drop 30 having a radius of curvature 50 larger generally away from the rolling direction 22 behind the midpoint of the bottom surface 44 in the longitudinal direction 16. The provision of a tear drop 30 with the ratio of the $R_{ref}$ to $R_{A.B.avg}$ results in a geometry of the tear drop 30 that may function to reduce or eliminate the initiation and propagation of cracks at this generally rearward portion of the tear drop 30 which may otherwise be more likely to occur based upon the way torque is imparted onto the tread 12.

Figure 1:
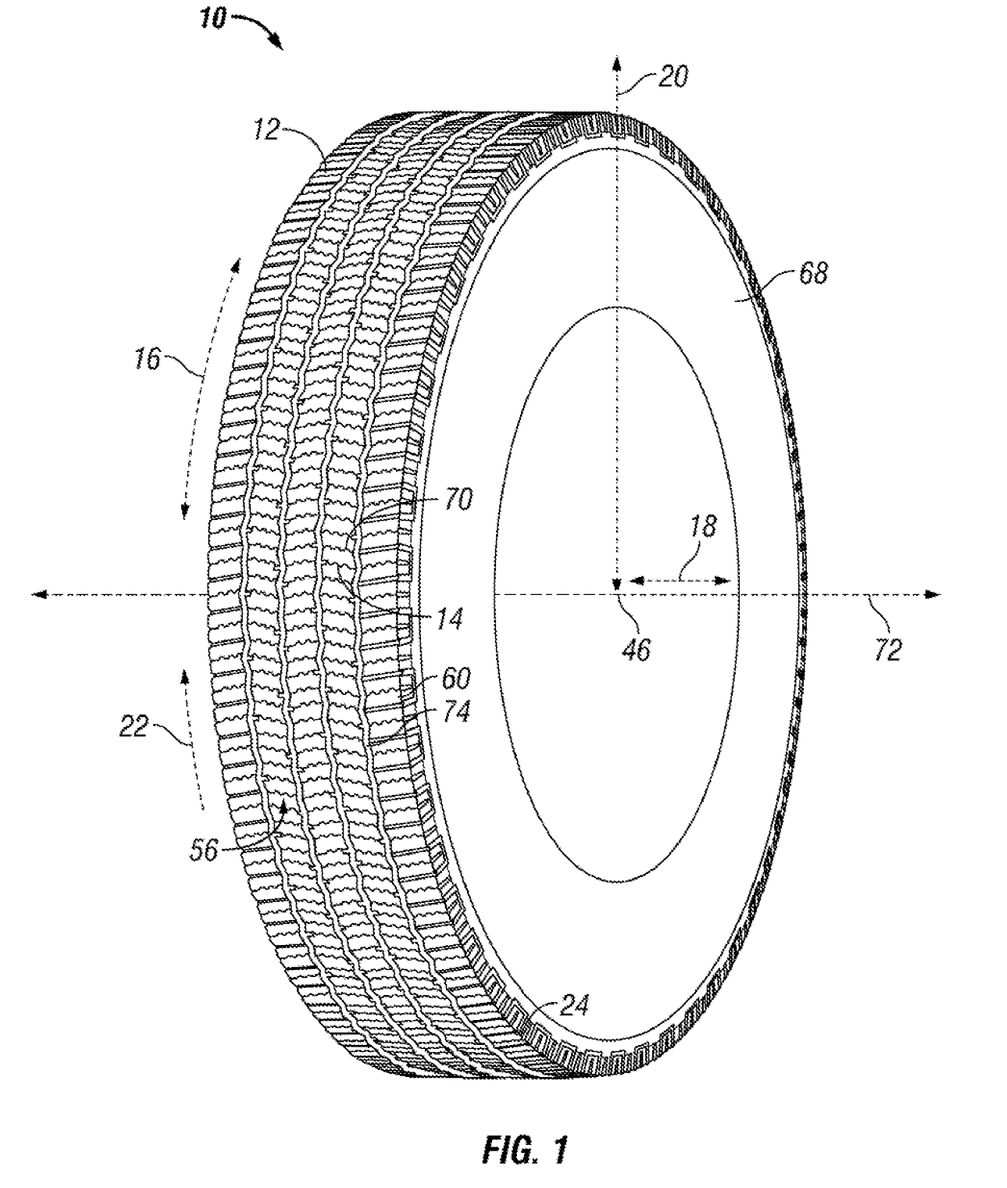
FIG. 1 is a perspective view of a heavy truck tire.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. The tire 10 includes a casing 68 onto which a tread 12 is disposed thereon. The central axis 72 of the tire 10 extends through the center of the casing 68, and the lateral (axial in this instance) direction 18 of the tire 10 is parallel to the central axis 72. The radial direction 20, which can also be known as the thickness direction 20, of the tire 10 is perpendicular to the central axis 72, and the tread 12 is located farther from the central axis 72 in the radial direction 20 than the casing 68. The tread 12 extends all the way around the casing 68 in the circumferential direction 16, also known as the longitudinal direction 16, of the tire 10 and circles the central axis 72 360 degrees.

The tread 12 features five ribs that are separated by four longitudinal grooves that extend in the circumferential direction 16. The five ribs can be classified as a central rib, two intermediate ribs, and two shoulder ribs. However, any number of ribs, or no ribs, can be present in other exemplary embodiments and the five ribs are present in only some embodiments. One of the shoulder ribs 60 is specifically identified and it is bounded on one side in the lateral direction 18 by a circumferential groove 74 and on an opposite side by a tread edge 24. The ribs can each be made up of a number of tread blocks that can have various shapes, sizes, and configurations. The inclusion of these architectural features gives the tread 12 different performance properties in use. The tread 12 may include certain structural features that can enhance the traction and/or the wear rate. One such structural feature shown with reference to FIG. 1 may be sipes 14 that extend across the tread blocks of the ribs in the lateral direction 18. The specific sipe 14 noted in FIG. 1 is in one of the intermediate ribs. The tread 12 has a first tread edge 24 and an oppositely disposed second tread edge in the lateral direction 18. The rolling tread width of the tread 12 extends from one edge 24 to the other edge and is the portion of the tread 12 that is designed to engage the ground when the tire 10 is new before any tread 12 wear has occurred.

Figure 2:
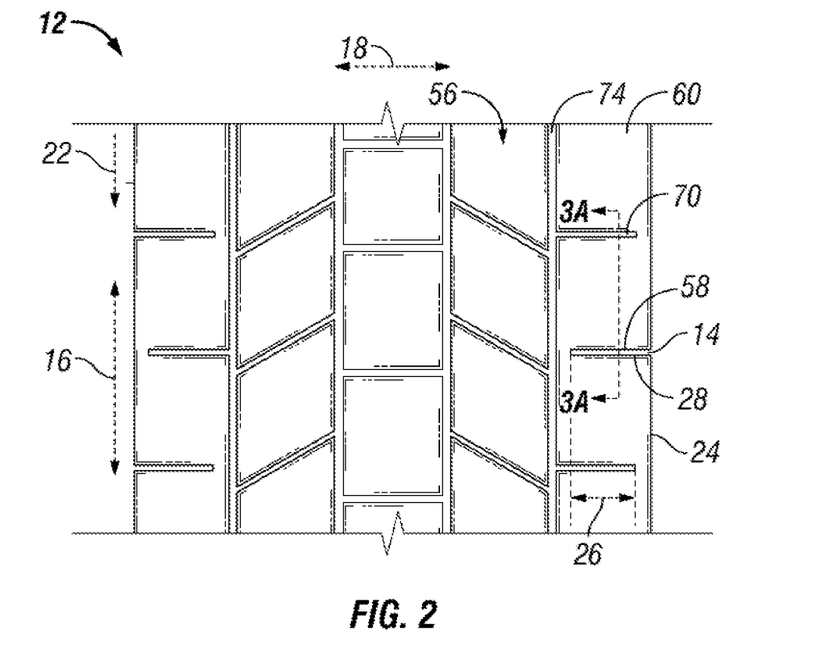
FIG. 2 is a front view of part of a tread that includes asymmetrical sipes.

FIG. 2 shows a portion of the front of the tread 12 in accordance with one exemplary embodiment. The tread 12 is a directional tread which is designed to roll primarily in one direction. The rolling direction 22 is the direction the tread 12 is designed to roll in the longitudinal direction 16, which may be the forward direction of the vehicle as opposed to the backwards, reverse direction of the vehicle. The asymmetrical sipe 14 is arranged in response to this rolling direction 22. The tread 12 with the asymmetrical sipe 14 in all exemplary embodiments can be provided as part of a tire 10 that is new, or can be provided as a retread band that is attached to a used casing 68. The asymmetrical sipes 14 are arranged so that they are successive. Asymmetrical sipe 14 is successive to a second asymmetrical sipe 70 in the longitudinal direction 16. The sipes 14, 70 share at least some of a common offset 26 from the tread edge 24 in the lateral direction 18. In this regard, the asymmetrical sipes 14, 70 are successive in the longitudinal direction 16 and have at least some common portions that are the same position in the lateral direction 18.

Figure 3A:
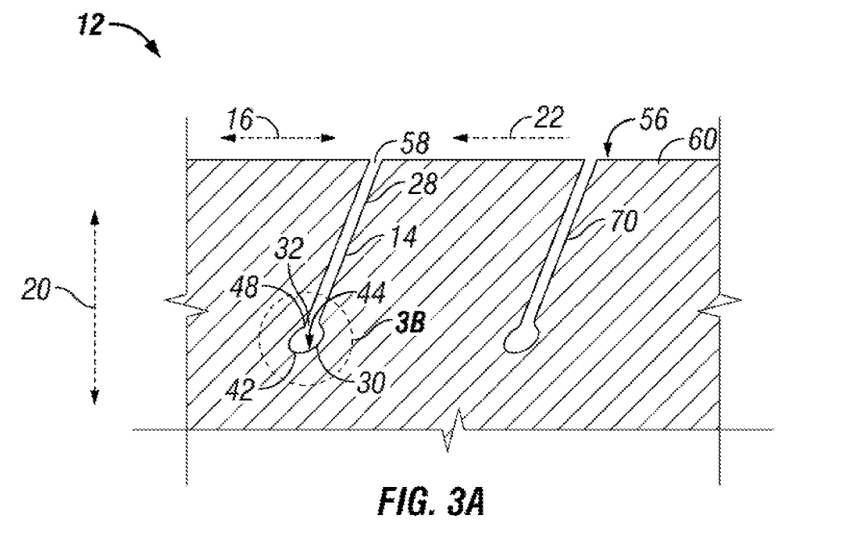
FIG. 3A is a cross-sectional view taken along line 3A-3a of FIG. 2.

FIG. 3A is a cross-sectional view taken along line 3A-3A of FIG. 2 that shows the cross-sectional shapes of the two asymmetrical sipes 14, 70. The asymmetrical sipes 14, 70 are identical to one another, but need not be in other embodiments. The sipe 14 has a body 28 with a top end 58 that is located at the tread surface 56 of the tread 12. The opposite end from the top end 58 is the bottom end 32 of the body 28 and the tear drop 30 extends from the bottom end 32 in the thickness direction 20 towards the center 46 of the tire 10. The body 28 extends from the tear drop 30 to the tread surface 56 at an inclination angle such that the bottom end 32 is not at the same position in the longitudinal direction 16 as the top end 58. The body 14 could be angled in the opposite direction relative to the rolling direction 22 in other embodiments, or may not be angled at all in various arrangements of the tread 12.

Figure 3B:
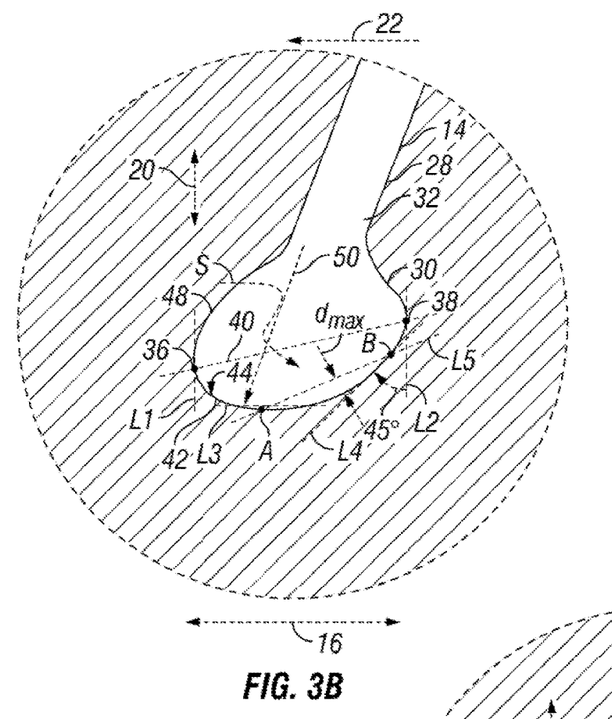
FIG. 3B is a detail view of circle 3B of FIG. 3A.

With reference as well to FIG. 3B, which is a detail view of the tear drop 30 of FIG. 3A, the asymmetrical shape of the tear drop 30 is shown. The tear drop 30 is asymmetrical in shape and has left and right tangent points 36 and 38. The tangent points 36 and 38 are points at opposite ends of the tear drop 30 in the longitudinal direction 16 that are locations at the extreme front end terminus and extreme back end terminus of the tear drop 30. Forward tangent line L1 extends through left tangent point 36, and rearward tangent line L2 extends through right tangent point 38. At least one of the tangent lines L1 and L2 extends in the thickness direction 20. In other embodiments, both of the tangent lines L1 and L2 extend in the thickness direction. The two tangent lines L1 and L2 are parallel to one another. The two tangent lines L1 and L2 engage the tear drop 30 at the aforementioned front and back end terminus of the tear drop 30 in the longitudinal direction 16.

An equator 40 is a line that is defined as a straight line that extends through the left tangent point 36 and the right tangent point 38. The equator 40 divides the tear drop 30 into a bottom 42 and a top 48. The bottom 42 of the tear drop 30 has a bottom surface 44.

The bottom 42 is the portion of the tear drop 30 on the side of the equator 40 closer to the center 46 of the tire 10 or deeper within the tread 12 in the thickness direction 20. The top 48 of the tear drop 30 is the portion of the tear drop 30 bounded by the equator 40 that is closer to the tread surface 56 than the bottom 42 in the thickness direction 20. The top 48 engages the body 28 at the bottom end 32. With respect to the top 48 and bottom 42 of the tear drop 30, the equator 40 separates these two portions 48 and 42 and the top 48 is closer to the tread surface 56 in the thickness direction 20 than the bottom 42 is to the tread surface 56.

The bottom surface 44 of the bottom 42 is curved and does not have the same radius of curvature 50 along the entire bottom surface 44. The curvature of the bottom surface 44 is generally concave in shape. The radius of curvature 50 of the bottom surface 44 is different at at least two different locations. The bottom surface 44 could be provided so that many different radii of curvature 50 are present, for instance from 5-10, from 11-15, or in theory, up to an infinite number of different radii of curvature 50 along the entire bottom surface 44. The tear drop 30 may be described as asymmetrical in shape because the bottom surface 44 has at least two different radii of curvature 50 so that the radius of curvature 50 of the bottom surface 44 is not the same along the entire bottom surface 44. An area S is the area of the cross-section of the tear drop 30 that is bound by the equator 40 and the bottom surface 44. Any technique known in the art can be used to calculate the cross-sectional area S.

The geometry of the tear drop 30 is constructed in relation to a reference radius $R_{ref}$. The reference radius $R_{ref}$ is defined by the following equation:

$$R_{ref} = \sqrt{\frac{2 \times S}{\pi}}$$

The reference radius $R_{ref}$ can be calculated after one obtains the area S. The reference radius $R_{ref}$ represents the average radius of the bottom surface 44 and will be used later to define the geometry of the asymmetrical sipe 14 in relation to a value of the average radius A to B $R_{A.B.avg}$.

An average radius A to B $R_{A.B.avg}$ can be calculated once certain other geometric features of the sipe 14 are determined. A line L3 is drawn on the sipe 14 and is a line perpendicular to the thickness direction 20. In some embodiments, the line L3 extends in the longitudinal direction 16. The line L3 is tangent to the bottom surface 44. The point of tangency of the line L3 with the bottom surface 44 is designated as tangent point A. If the tangency of line L3 with the bottom surface 44 constitutes a line as opposed to a single point, then point A is defined as the point at the end of the tangency line that is closest to right tangent point 38. A line L4 can then be drawn relative to the sipe 14. The line L4 is oriented at a 45 degree angle to the thickness direction 20. Line L4 at the 45 degree orientation is tangent to the bottom surface 44, and this point of tangency is designated as tangent point B which is a point on the bottom surface 44.

Tangent points A and B have a relationship such that they are both at the bottom surface 44 and the tangent point A is forward of the tangent point B in the rolling direction 22. Consequently, tangent point B is positioned rearward from tangent point A in the rolling direction 22, and tangent point B is below the right tangent point 38 on the bottom surface 44 and is not located at the right tangent point 38. If the tangency of line L4 with the bottom surface 44 constitutes a line as opposed to a single point, then point B is defined as the point at the end of the tangency line that is closest to tangent point A.

A line L5 passes through both the tangent point A and the tangent point B. With the establishment of this line L5, a value $d_{max}$ can be calculated. The $d_{max}$ value is the maximum perpendicular distance from line L5 to bottom surface 44. The distances from the line L5 to the bottom surface 44 are measured upon extending perpendicular to the line L5 from line L5 to the bottom surface 44. The greatest measured distance is designated at the $d_{max}$ maximum distance. Another value that is measured for determining the geometry of the sipe 14 is $d_{A.B.}$ which is the straight-line distance between tangent point A and tangent point B. The distance between tangent point A and tangent point B is measured along line L5.

The average radius between tangent points A and B is denoted as $R_{A.B.avg}$ and can be calculated using the following equation:

$$R_{A.B.\ avg} = \frac{d\max^2 + \left(\frac{dA.B.}{2}\right)^2}{2d\max}$$

After calculation of the average radius between tangent points A and B $R_{A.B.avg}$, the design of the sipe is such that the following relationship between $R_{A.B.avg}$ and the reference radius $r_{ref}$ exists and is as follows:

$R_{A.B.avg} > 1.4 \times R_{ref}$

The sipe 30 thus has a shape in which the average radius between tangent points A and B $R_{A.B.avg}$ is greater than 1.4 times the reference radius $R_{ref}$. The asymmetry of the sipe 14 is defined in the tear drop 30 section in that the radius of curvature 50 of the bottom surface 44 is not the same along the entire length of the bottom 42, but is instead different in at least two locations. The tire tread 12 includes a second asymmetrical sipe 70 that is successive to the first asymmetrical sipe 14 in the longitudinal direction 16 such that no other grooves or sipes are between the first and second successive sipes 14 and 70. The second asymmetrical sipe 70 as shown in FIG. 3A has the same cross-sectional configuration as the first asymmetrical sipe 14, and a repeat of all of the aforementioned features is not necessary. As such, the second asymmetrical sipe 70 can include all of the lines, distance, points, and curvatures as discussed above. The second asymmetrical sipe 70 can be identically formed to the first asymmetrical sipe 14, or can be different so long as it has the required $R_{A.B.Avg} > 1.4 \times R_{ref}$ relationship as previously described.

Cracking at the bottom surface 44 of the tear drop 30 for drive tires 10 under torque is typically initiated away from the bottom dead center of the bottom surface 44. Applicant theorizes that torque acting on the tread 12 causes cracks to develop behind the dead center in the direction opposite to the rolling direction 22, which could cause crack propagation under a leading edge of a block if present. Therefore, the relationship $R_{A.B.avg} > 1.4 \times R_{ref}$ has been designed to prevent or minimize this cracking. The bottom surface 44 has a shape that may be positioned at the location of the highest probability of crack initiation.

The tread 12 as disclosed herein is directional in nature, so that the orientation of the tear drop 30 can be set according to the rolling direction 22 to ensure it is in the location most likely to experience cracking. The design of the asymmetrical sipe 14, 70 may allow for a smaller tear drop 30 to be used so that traction and wear performance are maintained with resistance to cracking.

Another embodiment of the tread 12 is illustrated with reference to FIGS. 4, 5 and 5A. Here, the asymmetrical sipe 14 is again located within a shoulder rib 60 of the tread 12. The shoulder rib 60 is the rib bounded by the tread edge 24 on one side and the circumferential shoulder groove 74 on the opposite side in the lateral direction 18. The sipes 14 could be located in both shoulder ribs, the intermediate ribs, and/or the center rib in accordance with various exemplary embodiments. Although shown in the shoulder ribs, the asymmetrical sipes 14 need not be in them exclusively at all or in other embodiments. The sipes 14 can be arranged in a directional manner, with other tread 12 elements, so that the tread 12 is provided as a directional tread 12. The sipes 14 extend all the way across the width of the shoulder rib 60 in the lateral direction 18. The tread 12 features a first asymmetrical sipe 14 and a second asymmetrical sipe 70 that have identical lengths in the lateral direction 18, and who have an identical common offset 26. The common offset 26 is the distance in the lateral direction 18 both sipes 14 and 70 share from the tread edge 24. This common offset 26 is used to link the two sipes 14, 70 to one another as opposed to comparing the first asymmetrical sipe 14 to some other sipe on the tread 12, for example one in the center rib or one in the opposite shoulder rib. The tread 12 includes three symmetrical sipes 64 located between the successive asymmetrical sipes 14, 70 that also extend across the entire width of the shoulder rib 60 in the lateral direction 18 and that share the same common offset 26 as the sipes 14, 70.

Figure 5A:
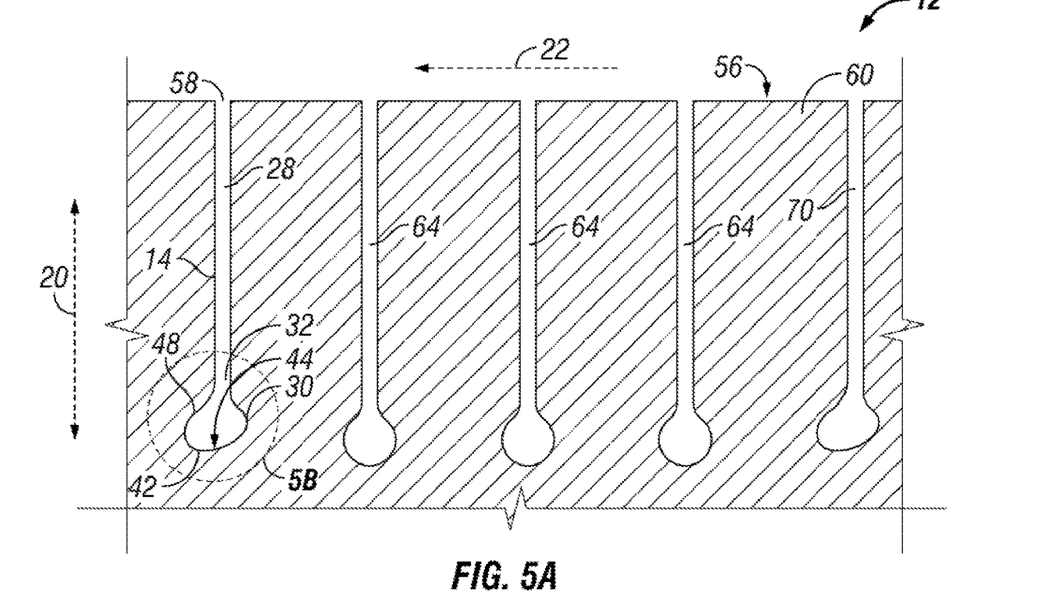
FIG. 5A is a cross-sectional view taken along line 5A-5A of FIG. 4.
Figure 5B:
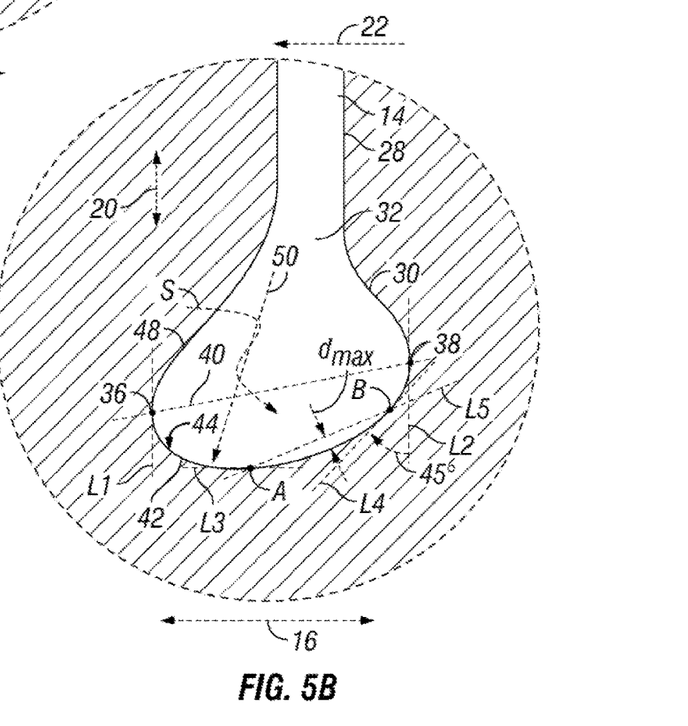
FIG. 5B is a detail view of circle 5B of FIG. 5A.

The cross-sectional view of the sipes 14, 70 and 64 is shown in FIGS. 5A and 5B and is taken through their cross-sectional widths along a line that is angled relative to the longitudinal direction 16 due to the angular orientations of the sipes 14, 70, 64 relative to the longitudinal direction 16. The cross-sectional view of the asymmetrical sipe 14 shown in FIGS. 5A and 5B has a body 28 that extends only in the thickness direction 20 and not in the longitudinal direction 16 such that the body 28 is not angled, unlike the body 28 as shown in the FIGS. 2 and 3 embodiments. The tear drop 30 may be arranged in a manner similar to those previously discussed with other embodiments in which the relationship $R_{A.B.avg} > 1.4 \times R_{ref}$ is rendered.

Figure 4:
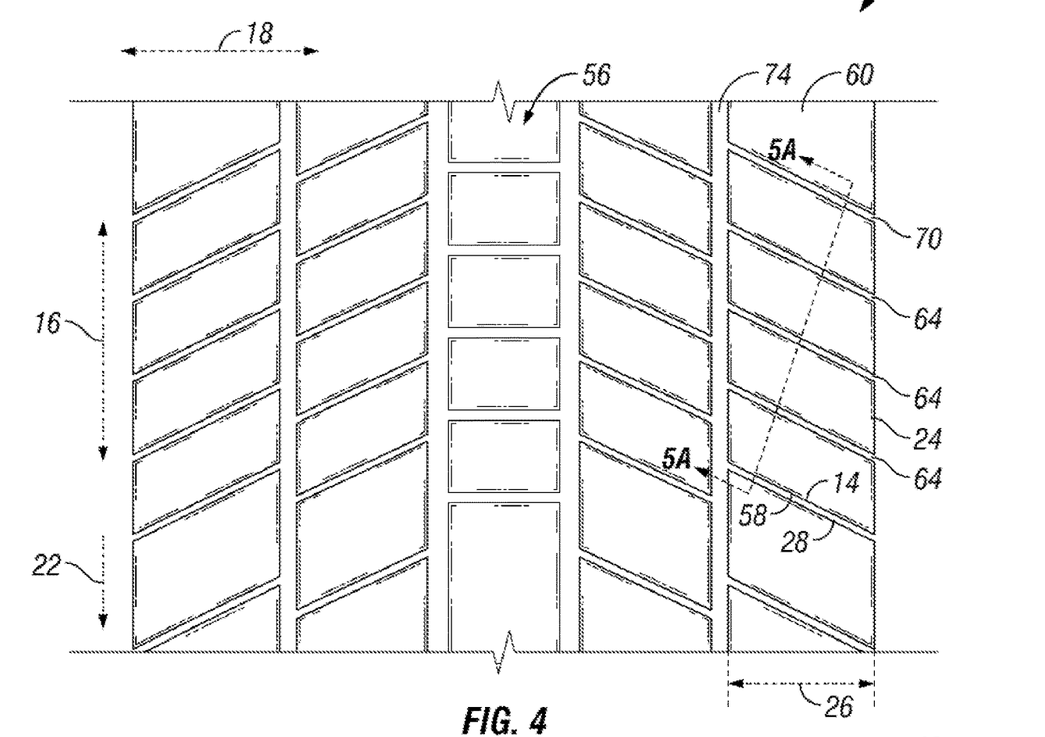
FIG. 4 is a front view of part of a tread that includes asymmetrical sipes in accordance with another exemplary embodiment.

The embodiment in FIGS. 4, 5A and 5B includes a second, successive asymmetrical sipe 70 to the first asymmetrical sipe 14. The second asymmetrical sipe 70 can be arranged identically to that of the first asymmetrical sipe 14. Alternatively, the second asymmetrical sipe 70 can be different than the first asymmetrical sipe 14 so long as the relationship $R_{A.B.avg} > 1.4 \times R_{ref}$ is maintained. There are three symmetrical sipes 64 located between the two asymmetrical sipes 14, 70 in the longitudinal direction 16. However, the asymmetrical sipes 14, 70 are still said to be successive because they are the two asymmetrical sipes 14, 70 next to one another successively in the longitudinal direction 16. The symmetrical sipes 64 have tear drops that are symmetric. In this regard, the bottoms of the tear drops of the symmetrical sipes 64 all feature the same radius of curvature. However, the radius of curvature could be different and the sipes 64 still symmetrical if the cross-section is a mirror image. When discussing the symmetry of sipes, it may be the case that only the bottom of the tear drop makes it symmetrical or asymmetrical due to the fact that the end of the body upon engaging the top of the tear drop could create asymmetry even though the remaining portions of the tear drop are symmetric. As such, a determination of the asymmetry of the sipe can be evaluated based upon the symmetry or asymmetry of the bottom of the tear drop as previously discussed.

Figure 6:
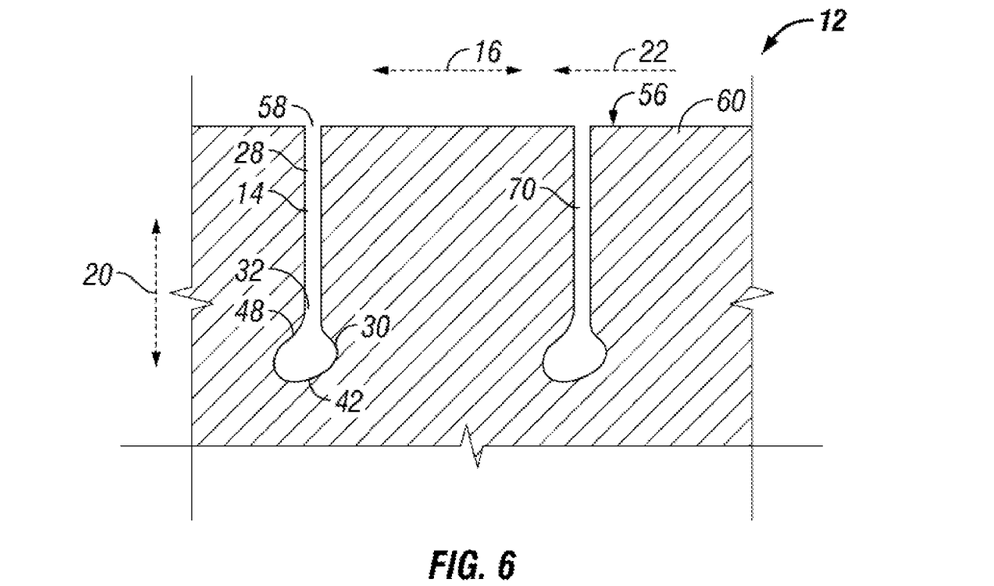
FIG. 6 is a cross-sectional view with asymmetrical sipes that have oval shaped tear drops.

FIG. 6 is a cross-sectional view of the tread 12 in accordance with another exemplary embodiment in which two successive asymmetrical sipes 14, 70 are again provided with the relationship $R_{A.B.avg} > 1.4 \times R_{ref}$. The asymmetrical sipes 14, 70 have tear drops 30 that are oval in shape. The ovals are oriented so that the relationship $R_{A.B.avg} > 1.4 \times R_{ref}$ is realized. Other embodiments of the present tread 12 exist in which $R_{A.B.avg} > 1.4 \times R_{ref}$ in two successive asymmetrical sipes 14, 70 that are not oval shaped tear drops 30. There are no symmetrical sipes 64, grooves 66, or other tread features between the two successive asymmetrical sipes 14, 70 in the longitudinal direction 16. As such, the asymmetrical sipes 14, 70 are not only oval in shape, but are ovals that are oriented relative to the thickness and longitudinal directions 20, 16 so that $R_{A.B.avg} > 1.4 \times R_{ref}$ as defined. It is to be understood that the tear drop 30 could be oval in shape, but need not be oval in shape in other embodiments. Any shape of the tear drop 30 could be utilized so long at the disclosed geometric bounds are followed to yield the $R_{A.B.avg} > 1.4 \times R_{ref}$ relationship. This relationship can be calculated using the techniques described above and a repeat of this information is not necessary.

Figure 7:
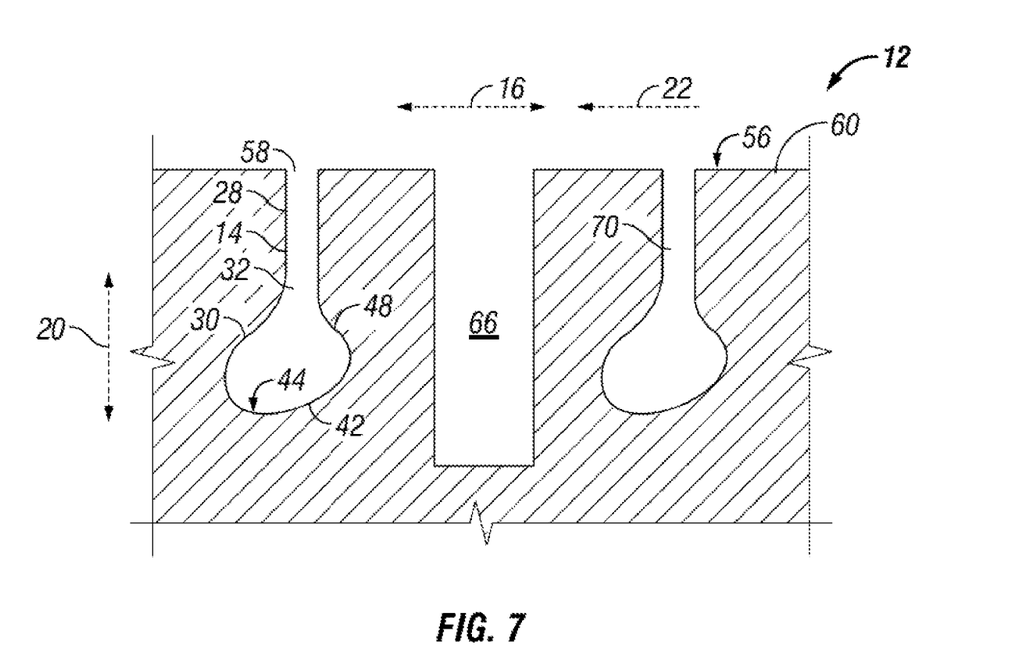
FIG. 7 is a cross-sectional view with successive asymmetrical sipes separated by a groove.

FIG. 7 shows an embodiment of the tread 12 in which two successive asymmetrical sipes 14, 70 are present in the tread 12 and again include the relationship $R_{A.B.avg} > 1.4 \times R_{ref}$. This relationship can be calculated using the techniques described above and a repeat of this information is not necessary. A groove 66 is located between the two asymmetrical sipes 14, 70 in the longitudinal direction 16.

An example of calculating $R_{ref}$ and $R_{A.B.avg}$ to describe how $R_{A.B.avg}$ is greater than 1.4 times $R_{ref}$ is provided. Here, the teardrop 30 has an ellipse shape which is used to define the bottom profile 44 of the tear drop 30 and has dimensions of 3.4 mm along its longest axis and 2.0 mm along its shortest axis. The formula for the area of an ellipse is πab, where a is the half-length of the longer axis and b is the half-length of the shorter axis. Based on this formula, the area of the ellipse is 5.34 mm². Knowing that the equator line 40 exactly bisects the ellipse, the area bounded by the equator line 40 and the bottom surface 44 is half the area of the full ellipse, or 2.67 mm². Using the equation for $R_{ref}$, then the reference radius $R_{ref}$ calculates to 1.30 mm. The orientation of the ellipse shaped teardrop 30 can then be examined and measured to yield in this particular example $d_{A.B}$=1.95 mm and $d_{max}$=0.09 mm. Using the equation above for the average radius $R_{A.B.avg}$ between points A and B one calculates it to be 5.33 mm. This value is greater than $1.4 \times R_{ref}$ (5.33 mm > 1.82 mm).

It will be apparent to those skilled in the art that various modifications and variations can be made in the present invention without departing from the scope or spirit of the invention. For instance, features illustrated or described as part of one embodiment, can be used with another embodiment to yield a still further embodiment. As already discussed above, a tread or tire according to the invention may also comprise tread halves that are notably different from one another as long as each tread half remains within the scope of the invention as limited by the claims. Thus, it is intended that the present invention covers such modifications and variations as they fall within the scope of the appended claims and their equivalents.

The invention claimed is:

1. A heavy truck tire directional tread of a tire having a longitudinal direction, a lateral direction and a thickness direction, and a rolling direction in the longitudinal direction, comprising:
    a tread edge;
    two successive asymmetrical sipes in the longitudinal direction that share at least some of the same offset from the tread edge in the lateral direction, wherein each of the two asymmetrical sipes are arranged to have:
    a body; and
    a tear drop located at a bottom end of the body, wherein the tear drop has a forward tangent line L1 and a rearward tangent line L2 wherein one of which extends in the thickness direction, wherein the forward tangent line L1 is parallel to the rearward tangent line, wherein the forward tangent line L1 extends through a left tangent point and wherein the rearward tangent line L2 extends through a right tangent point, wherein an equator is a straight line that extends through the left and right tangent points, wherein a bottom of the tear drop is the portion of the tear drop bounded by the equator and closer to a center of the tire than a remaining top portion of the tear drop on an opposite side of the equator that is farther from the center of the tire; wherein the bottom has a surface that has a radius of curvature that is not the same along the entire surface of the bottom;
    wherein S is an area bounded by the equator and the surface of the bottom, and wherein a reference radius $R_{ref}$ is calculated as follows:

$$R_{ref} = \sqrt{\frac{2 \times S}{\pi}};$$

wherein line L3 is perpendicular to the thickness direction and extends through a tangent point A at the surface of the bottom;
    wherein tangent point B is at the surface of the bottom in a direction from tangent point A opposite to a rolling direction, and line L4 extends through tangent point B and is oriented at a 45 degree angle to the thickness direction;
    wherein line L5 extends through tangent point A and tangent point B;
    wherein $d_{max}$ is the maximum distance between line L5 and the surface of the bottom as measured perpendicular to line L5;
    wherein $d_{A.B.}$ is the straight-line distance along line L5 from tangent point A to tangent point B;
    wherein an average radius between tangent point A and tangent point B $R_{A.B.\ avg}$ is calculated as follows:

$$R_{A.B.avg} = \frac{d\max^2 + \left(\frac{dA.B.}{2}\right)^2}{2d\max};$$

wherein $R_{A.B.\ avg} > 1.4 \times R_{ref}$;
    wherein the entire surface of the bottom is completely concave in shape from the left tangent point to the right tangent point, and wherein a top surface of the top portion is concave in shape at locations that engage the left tangent point and the right tangent point; and wherein the equator extends a greater distance in the longitudinal direction than in the thickness direction, and wherein a left surface of the teardrop that extends from tangent point A through the left tangent point to the body is asymmetric as compared to a right surface of the teardrop that extends from tangent point A through the right tangent point to the body.

2. The tread as set forth in claim 1, wherein the tear drop has an oval cross- sectional shape.

3. The tread as set forth in claim 1, wherein the tread has a tread surface, and wherein the body has a top end located at the tread surface, wherein the top end of the body and the bottom end of the body are spaced from one another in the thickness direction and are not spaced from one another in the longitudinal direction.

4. The tread as set forth in claim 1, wherein the tread has a tread surface, and wherein the body has a top end located at the tread surface, wherein the top end of the body and the bottom end of the body are spaced from one another in the thickness direction and are spaced from one another in the longitudinal direction.

5. The tread as set forth in claim 1, wherein the tread has a shoulder rib at least partially defined by the tread edge, and wherein each of the two asymmetrical sipes are located in the shoulder rib.

6. The tread as set forth in claim 1, wherein the two successive asymmetrical sipes have an identical offset from the tread edge in the lateral direction.

7. The tread as set forth in claim 1, wherein the two successive asymmetrical sipes are immediately adjacent in the longitudinal direction such that no sipes and such that no grooves are present between the two successive asymmetrical sipes in the longitudinal direction at all of the same offset from the tread edge shared by the two successive asymmetrical sipes.

8. The tread as set forth in claim 1, wherein at least one symmetrical sipe is located between the two successive asymmetrical sipes in the longitudinal direction at at least some of the same offset from the tread edge shared by the two successive asymmetrical sipes.

9. The tread as set forth in claim 8, wherein three of the symmetrical sipes are located between the two successive asymmetrical sipes in the longitudinal direction at at least some of the same offset from the tread edge shared by the two successive asymmetrical sipes.

10. The tread as set forth in claim 1, wherein a groove is located between the two successive asymmetrical sipes in the longitudinal direction at least some of the same offset from the tread edge shared by the two successive asymmetrical sipes.

11. A heavy truck tire comprising the tread according to claim 1.

* * * * *